Nov. 28, 1933.  L. E. PALMER  1,937,094
APPARATUS FOR SIMULTANEOUSLY COOLING CEMENT CLINKER
AND EXTRACTING MOISTURE FROM SLURRY
Filed June 15, 1931
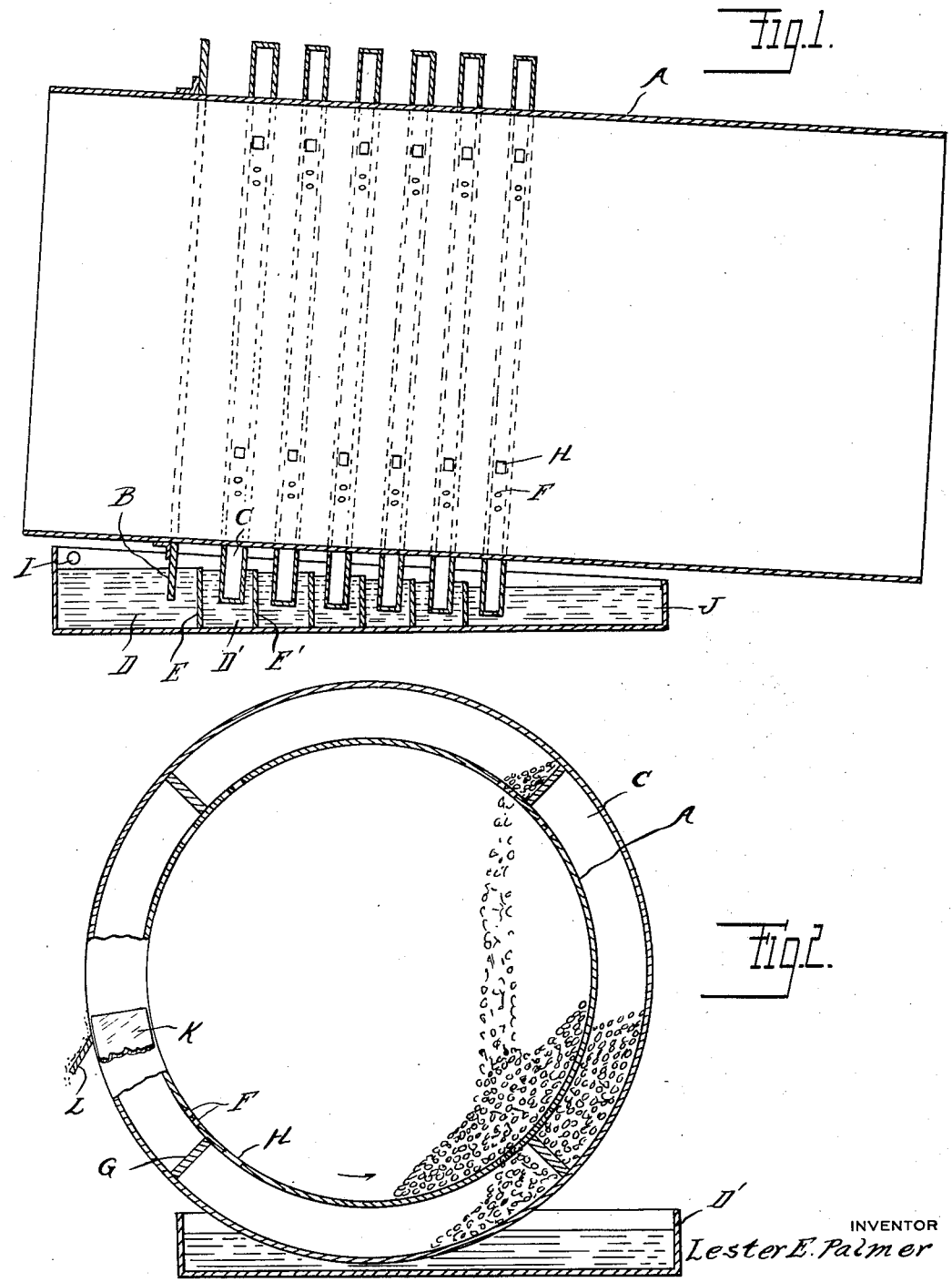
INVENTOR
Lester E. Palmer
BY Whittemore Hulbert
Whittemore & Belknap
ATTORNEYS Patented Nov. 28, 1933

1,937,094

UNITED STATES PATENT OFFICE 1,937,094

APPARATUS FOR SIMULTANEOUSLY COOLING CEMENT CLINKER AND EXTRACTING MOISTURE FROM SLURRY

Lester E. Palmer, Osborn, Ohio, assignor of one-half to Wabash Portland Cement Company, Detroit, Mich., a corporation of Indiana Application June 15, 1931. Serial No. 544,666

7 Claims. (Cl. 222—7)

The invention relates to the manufacture of Portland cement and has for its object the obtaining of greater efficiency by the utilization of waste heat for the extraction of moisture. It is a further object to obtain this waste heat from the hot clinker which is therefore more quickly cooled and improved in quality. With these objects in view the invention consists in the method and apparatus as hereinafter set forth.

In the drawing:

Figure 1 is a longitudinal section through a portion of the apparatus;

Figure 2 is a cross section thereof.

In the manufacture of Portland cement, one method extensively used is to introduce the mixed ingredients into the kiln with a relatively large amount of water, the mixture being commonly known as slurry. All of the water so introduced must be evaporated before the solid ingredients can be brought to the proper temperature and this requires the expenditure of heat. On the other hand, the cement is discharged from the kiln in the form of highly heated clinker which must be cooled and the quality of this clinker is improved by comparatively rapid cooling. With my improvement the waste heat in the clinker is utilized for partially drying or extracting a certain portion of the moisture from the slurry so as to require less heat for its complete drying.

The apparatus preferably employed for carrying out this method consists in a revolving cylinder A having its axis slightly inclined so as to cause the feeding of material introduced therein from one end to the other. The periphery of this cylinder is surrounded with a series of heat conducting fins which may either be solid such as B or hollow as at C. Segments of these fins dip into a series of troughs D, D', etc., which are separated by partitions E, E', etc., of progressively diminished height so as to permit the overflow of slurry from one compartment to the other. Where the hollow fins C are employed the drum A is provided with a series of small apertures F communicating with the interior of this fin and of sufficient size to permit the clinker to pass therethrough. The annular chamber within the fins is also divided by radial partitions G into a number of compartments, four being shown in the construction illustrated. Larger apertures H are arranged at one end of each of these compartments to more readily permit the passage of clinkers so as to insure its complete discharge from the compartment in the fin at a certain point in the cycle.

With an apparatus constructed as described the slurry is fed into the upper end of the series of troughs through a conduit I and will progressively overflow from one trough to another until it reaches the lowest one J. The hot clinker directly from the kiln is introduced into the upper end of the cylinder A and during the revolution of the latter will slowly travel down the incline and will pass through the apertures F into the hollow fins. The heat of the clinker is thus communicated to the side walls of the fins which are dipped in the slurry, communicating the heat to the latter and causing evaporation of the moisture. The slurry as it passes from trough to trough is progressively thickened by loss of moisture so that in the lowermost trough J the moisture content is considerably less. This operation continues, the clinker entering the compartments within the fins at the forward end in the direction of rotation of the drum and being discharged through the apertures H at the rear end of the compartment when carried to the upper side of the cylinder. In this manner the clinker is progressively moved downward towards the discharge end of the cylinder and when discharged is greatly lower in temperature.

The fins in passing through the slurry will retain a certain amount thereof adhering to the side walls which will become dried and would eventually build up a thick coating. This result is prevented by arranging at one point in the revolution a series of scrapers K and L engaging the periphery and side walls of the fins and removing the adhering coating therefrom. The material so removed may be either mixed with the wet slurry or separately introduced into the kiln.

While I prefer to use the hollow fins in the manner described, a beneficial effect is obtained even where the fins are solid as indicated at B. Also, instead of making the cylinder A as a distinct unit from the kiln, it is obvious that it might be made as a forward extension of the kiln beyond the heating zone. In each case, the hot clinker will be cooled and the heat abstracted therefrom will be used in drying the slurry.

What I claim as my invention is:

1. An apparatus for simultaneously cooling cement clinker and extracting moisture from slurry comprising a revoluble cylinder through which the hot clinker is fed, heat conducting fins projecting from the periphery of said cylinder and receptacles for the slurry through which said fins are passed.

2. An apparatus for simultaneously cooling cement clinker and extracting moisture from slurry comprising a revoluble cylinder through which the hot clinker is passed, a series of heat conducting fins projecting from the periphery of said cylinder, and a series of containers for the slurry through which the respective fins are passed.

3. An apparatus for simultaneously cooling cement clinker and extracting moisture from slurry comprising a revoluble cylinder having its axis slightly inclined downward through which the hot clinker is passed, a series of fins projecting from the periphery of said cylinder, a container for the slurry having a series of troughs or compartments of progressively diminishing height to permit of overflow of the slurry from one compartment to the other, said compartments being arranged to receive segments of said fins.

4. An apparatus for simultaneously cooling cement clinker and extracting moisture from slurry comprising a revoluble cylinder through which the hot clinker is passed, a series of annular fins projecting from the periphery of the cylinder, a container for the slurry having a series of compartments into which segments of the respective fins are dipped and scrapers for removing the adhering material from the fins at one point in the revolution of the cylinder.

5. An apparatus for simultaneously cooling cement clinker and extracting moisture from slurry comprising a revoluble cylinder through which the hot clinker is passed, a series of hollow annular fins projecting from the periphery of the cylinder, the walls of the latter being apertured for communication between the interior of the cylinder and the interior of the fins to permit the passage of clinker, and a container for the slurry into which segments of said fins are dipped.

6. An apparatus for simultaneously cooling cement clinker and extracting moisture from slurry comprising a cylinder through which the hot clinker is passed, a series of hollow annular fins projecting from the periphery of the cylinder, the walls of the latter being apertured for communication between the interior of the cylinder and the interior of the fins, and radial partitions for dividing the annular space within the fins into segments.

7. An apparatus for simultaneously cooling cement clinker and extracting moisture from slurry comprising a revoluble cylinder having its axis slightly inclined from the horizontal and through which the hot clinker is passed, a series of hollow annular fins projecting from the periphery of said cylinder, the walls of the latter being apertured for the passage of clinker into the chamber within the fins, radial partitions for dividing the annular space into segments with an enlarged aperture in the cylinder wall at one end of each segment for the discharge of clinker therethrough, and a receptacle for the slurry having a series of compartments for receiving segments of the respective fins and arranged to permit overflow of the slurry from one compartment to the other.

LESTER E. PALMER.